(12) United States Patent
Arimilli et al.

(10) Patent No.: US 6,338,124 B1
(45) Date of Patent: Jan. 8, 2002

(54) MULTIPROCESSOR SYSTEM BUS WITH SYSTEM CONTROLLER EXPLICITLY UPDATING SNOOPER LRU INFORMATION

(75) Inventors: Ravi Kumar Arimilli, Austin; John Steven Dodson, Pflugerville; Guy Lynn Guthrie; Jody B. Joyner, both of Austin; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,229

(22) Filed: Aug. 4, 1999

(51) Int. Cl.$^7$ .............................................. G06F 12/08
(52) U.S. Cl. ...................... 711/144; 711/121; 711/146
(58) Field of Search ................................. 711/121, 122, 711/136, 143, 144, 145, 146

(56) References Cited

U.S. PATENT DOCUMENTS

| | | |
|---|---|---|
| 4,797,814 A | 1/1989 | Brenza |
| 5,369,753 A | 11/1994 | Tipley |
| 5,493,668 A | 2/1996 | Elko et al. |
| 5,564,035 A | 10/1996 | Lai |
| 5,636,355 A | 6/1997 | Ramakrishnan et al. |
| 5,829,040 A | 10/1998 | Son |
| 5,895,495 A | 4/1999 | Armilli et al. |
| 5,946,709 A | 8/1999 | Arimilli et al. |
| 5,966,729 A | 10/1999 | Phelps |
| 6,018,791 A | 1/2000 | Arimilli et al. |
| 6,021,468 A | 2/2000 | Arimilli et al. |
| 6,023,747 A | 2/2000 | Dodson |
| 6,029,204 A | 2/2000 | Arimilli et al. |
| 6,058,456 A | 5/2000 | Arimilli et al. |
| 6,195,729 B1 | 2/2001 | Arimilli et al. |

OTHER PUBLICATIONS

Texas Instruments Incorporated, TMS32010 User's Guide, 1983, 3 pages.
Lebeck, A. R., Sohi, G. S.; *Request Combining in Multiprocessors with Arbitrary Interconnection Networks*, IEEE Digital Library, vol. 5, Issue 11, Nov. 1994.
Handy, Jim; *The Cache Memory Book*; Academic Press, Inc; 1993; pp. 77–82.

*Primary Examiner*—Hiep T. Nguyen
(74) *Attorney, Agent, or Firm*—Casimer K. Salys; Bracewell & Patterson L.L.P.

(57) ABSTRACT

Combined response logic for a bus receives a combined data access and cast out/deallocate operation initiating by a storage device within a specific level of a storage hierarchy, with a coherency state and LRU position of the cast out/deallocate victim appended. Snoopers on the bus drive snoop responses to the combined operation with the coherency state and/or LRU position of locally-stored cache lines corresponding to the victim appended. The combined response logic determines, from the coherency state and LRU position information appended to the combined operation and the snoop responses, whether an update of the LRU position and/or coherency state of a cache line corresponding to the victim within one of the snoopers is required. If so, the combined response logic selects a snooper storage device to have at least the LRU position of a respective cache line corresponding to the victim updated, and appends an update command identifying the selected snooper to the combined response. The snooper selected to be updated may be randomly chosen, selected based on LRU position of the cache line corresponding to the victim within respective storage, or selected based on other criteria.

20 Claims, 6 Drawing Sheets

MULTIPROCESSOR SYSTEM BUS WITH SYSTEM CONTROLLER EXPLICITLY UPDATING SNOOPER LRU INFORMATION

The present invention is related to the subject matter of commonly assigned, copending United States patent applications: Ser. No. 09/368,222 entitled "MULTIPROCESSOR SYSTEM BUS WITH READ/CASTOUT (RCO) ADDRESS TRANSACTION"; Ser. No. 09/368,221 entitled "SYSTEM BUS DIRECTORY SNOOPING MECHANISM FOR READ/CASTOUT (RCO) ADDRESS TRANSACTION"; Ser. No. 09/368,225 entitled "PRECISE INCLUSIVITY MECHANISM FOR SYSTEM BUS WITH READ/DEALLOCATE (RDA) ADDRESS TRANSACTION"; Ser. No. 09/368,224 entitled "MULTIPROCESSOR SYSTEM BUS WITH CACHE STATE AND LRU SNOOP RESPONSES FOR READ/CASTOUT (RCO) ADDRESS TRANSACTION"; Ser. No. 09/368223 entitled "UPGRADING OF SNOOPER CACHE STATE MECHANISM FOR SYSTEM BUS WITH READ/CASTOUT (RCO) ADDRESS TRANSACTIONS"; Ser. No. 09/368,227 entitled "MULTIPROCESSOR SYSTEM BUS WITH COMBINED SNOOP RESPONSES IMPLICITLY UPDATING SNOOPER LRU POSITION"; Ser. No. 09/368,226 now U.S. Pat. No. 6,275,909 entitled "MULTIPROCESSOR SYSTEM BUS WITH SYSTEM CONTROLLER EXPLICITLY UPDATING SNOOPER CACHE STATE INFORMATION"; Ser. No. 09/368,228 entitled "MULTIPROCESSOR SYSTEM BUS WITH COMBINED SNOOP RESPONSES EXPLICITLY CANCELLING MASTER VICTIM SYSTEM BUS TRANSACTION"; Ser. No. 09/368,230 entitled "MULTIPROCESSOR SYSTEM BUS WITH COMBINED SNOOP RESPONSES EXPLICITLY CANCELLING MASTER ALLOCATION OF READ DATA"; and Ser. No. 09/368,231 entitled "MULTIPROCESSOR SYSTEM BUS WITH COMBINED SNOOP RESPONSES EXPLICITLY INFORMING SNOOPERS TO SCARF DATA". The content of the above-identified applications is incorporated herein by reference.

BACKGROUND OF THE INVENTION

1. Technical Field:

The present invention relates in general to data storage management in data processing systems and in particular to coherency state and LRU position information maintained for data storage management. Still more particularly, the present invention relates to altering cache coherency states and/or LRU positions in response to related data access and cast out or deallocate operations in a data processing system.

2. Description of the Related Art:

High performance data processing systems typically include a number of levels of caching between the processor (s) and system memory to improve performance, reducing latency in data access operations. When utilized, multiple cache levels are typically employed in progressively larger sizes with a trade off to progressively longer access latencies. Smaller, faster caches are employed at levels within the storage hierarchy closer to the processor or processors, while larger, slower caches are employed at levels closer to system memory. Smaller amounts of data are maintained in upper cache levels, but may be accessed faster.

Within such systems, when data access operations frequently give rise to a need to make space for the subject data. For example, when retrieving data from lower storage levels such as system memory or lower level caches, a cache may need to overwrite other data already within the cache because no further unused space is available for the retrieved data. A replacement policy—typically a least-recently-used (LRU) replacement policy—is employed to decide which cache location(s) should be utilized to store the new data.

Often the cache location (commonly referred to as a "victim") to be overwritten contains only data which is invalid or otherwise unusable from the perspective of a memory coherency model being employed, or for which valid copies are concurrently stored in other devices within the system storage hierarchy. In such cases, the new data may be simply written to the cache location without regard to preserving the existing data at that location.

At other times, however, the cache location selected to received the new data contains modified data, or data which is otherwise unique or special within the storage hierarchy. In such instances, the replacement of data within a selected cache location (a process often referred to as "updating" the cache) requires that any modified data associated with the cache location selected by the replacement policy be written back to lower levels of the storage hierarchy for preservation. The process of writing modified data from a victim to system memory or a lower cache level is generally called a cast out or eviction.

When a cache initiates a data access operation—for instance, in response to a cache miss for a READ operation originating with a processor—typically the cache will initiate a data access operation (READ or WRITE) on a bus coupling the cache to lower storage levels. If the replacement policy requires that a modified cache line be overwritten, compelling a cast out for coherency purposes, the cache will also initiate the cast out bus operation.

Even when the selected victim contains data which is neither unique nor special within the storage hierarchy (i.e. invalid data), an operation to lower levels of the storage hierarchy may still be required. For instance, the cache organization may be "inclusive," meaning that logically vertical in-line caches contain a common data set. "Precise" inclusivity requires that lower level caches include at least all cache lines contained within a vertically in-line, higher level cache, although the lower level cache may include additional cache lines as well. Imprecise or "pseudo-precise" inclusivity relaxes this requirement, but still seeks to have as much of the data within the higher level cache copied within the lower level cache as possible within constraints imposed by bandwidth utilization tradeoffs. Within an inclusive, hierarchical cache system, even if the cache line to be replaced is in a coherency state (e.g., "shared") indicating that the data may be simple discarded without writing it to lower level storage, an operation to the lower level storage may be required to update inclusivity information. The storage device within which the cache line is to be overwritten (or "deallocated" and replaced) initiates an operation notifying lower level, in-line storage devices of the deallocation, so that the lower level devices may update internal inclusivity information associated with the cache line. This requires an operation in addition to the data access operation necessitating replacement of the cache line.

The data access and cast out/deallocate bus operations represent opportunities for global data storage management. In particular, the coherency state and LRU position of the cast out or deallocate victim in horizontal storage devices may be updated based on the change in the storage device initiating the data access and cast out/deallocate operations. However, due to the disjoint nature of the related operations in the prior art, such opportunities are not generally exploited. Additionally, a lack of sufficient information from other horizontal storage devices may prevent exploitation of data storage management opportunities in related data access and replacement operations.

It would be desirable, therefore, to take advantage of data storage management opportunities represented by related data access and cast out or deallocate bus operations. It would further be advantageous to support alteration of coherency state and/or LRU position information for cast out or deallocate victims in horizontal storage devices.

SUMMARY OF THE INVENTION

It is therefore one object of the present invention to provide improved data storage management in data processing systems.

It is another object of the present invention to provide improved management of coherency state and LRU position information maintained for data storage.

It is yet another object of the present invention to provide alteration of cache coherency states and LRU positions in response to related data access and cast out or deallocate operations in a data processing system.

The foregoing objects are achieved as is now described. Combined response logic for a bus receives a combined data access and cast out/deallocate operation initiating by a storage device within a specific level of a storage hierarchy, with a coherency state and LRU position of the cast out/deallocate victim appended. Snoopers on the bus drive snoop responses to the combined operation with the coherency state and/or LRU position of locally-stored cache lines corresponding to the victim appended. The combined response logic determines, from the coherency state and LRU position information appended to the combined operation and the snoop responses, whether an update of the LRU position and/or coherency state of a cache line corresponding to the victim within one of the snoopers is required. If so, the combined response logic selects a snooper storage device to have at least the LRU position of a respective cache line corresponding to the victim updated, and appends an update command identifying the selected snooper to the combined response. The snooper selected to be updated may be randomly chosen, selected based on LRU position of the cache line corresponding to the victim within respective storage, or selected based on other criteria.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
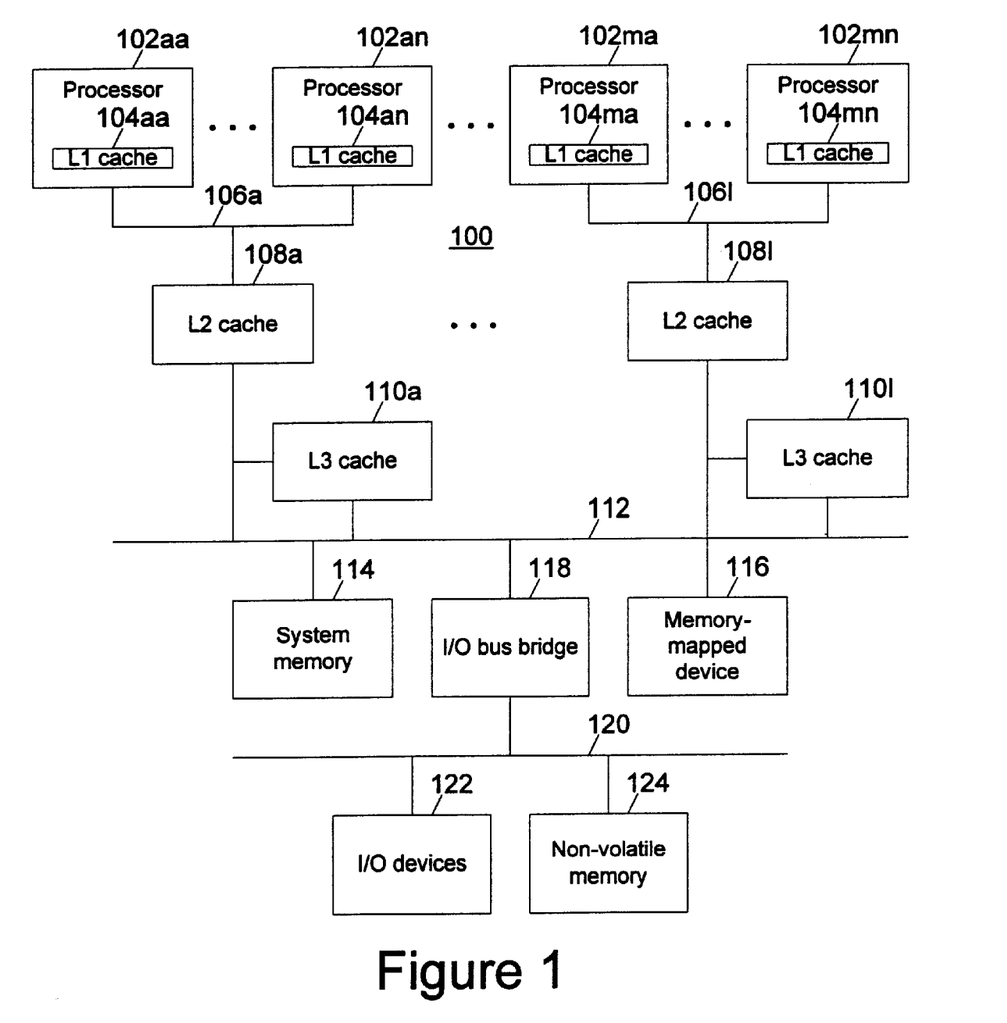
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 is a symmetric multiprocessor (SMP) system including a plurality of processors 102$aa$ through 102$an$ and 102$ma$ through 102$mn$ (where "m" and "n" are integers). Each processor 102$aa$–102$mn$ includes a respective level one (L1) cache 104$aa$–104$mn$, preferably on chip with the processor and bifurcated into separate instruction and data caches. Each processor 102$aa$–102$mn$ is coupled via a processor bus 106$aa$–106$l$ to a level two cache 108$a$–108$l$ (where "l" is an integer), which are in-line caches shared by multiple processors in the exemplary embodiment.

Although in the exemplary embodiment only two processors are depicted as sharing each L2 cache, and only two L2 caches are depicted, those skilled in the art will appreciate that additional processors L2 caches may be utilized in a multiprocessor data processing system in accordance with the present invention. For example, each L2 cache may be shared by four processors, and a total of sixteen L2 caches may be provided.

Each L2 cache 108$a$–108$l$ is connected to a level three (L3) cache 110$a$–110$l$ and to system bus 112. L3 caches 110$a$–110$l$ are actually in-line caches rather than lookaside caches as FIG. 1 suggests, but operations received from a vertical L2 cache (e.g., L2 cache 108$a$) are initiated both within the L3 cache 110$a$ and on system bus 112 concurrently to reduce latency. If the operation produces a cache hit within the L3 cache 110$a$, the operation is cancelled or aborted on system bus 112. On the other hand, if the operation produces a cache miss within the L3 cache 110$a$, the operation is allowed to proceed on system bus 112.

The lower cache levels—L2 caches 108$a$–108$l$ and L3 caches 110$a$–110$l$—are employed to stage data to the L1 caches 104$a$–104$l$ and typically have progressively larger storage capacities but longer access latencies. L2 caches 108$a$–108$l$ and L3 caches 110$a$–110$l$ thus serve as intermediate storage between processors 102$a$–102$l$ and system memory 114, which typically has a much larger storage capacity but may have an access latency many times that of L3 caches 110$a$–110$l$. Both the number of levels in the cache hierarchy and the cache hierarchy configuration (i.e, shared versus private, in-line versus lookaside) employed in data processing system 100 may vary.

L2 caches 108$a$–108$l$ and L3 caches 110$a$–110$l$ are connected to system memory 114 via system bus 112. Also connected to system bus 112 may be a memory mapped device 116, such as a graphics adapter providing a connection for a display (not shown), and input/output (I/O) bus bridge 118. I/O bus bridge 118 couples system bus 112 to I/O bus 120, which may provide connections for I/O devices 122, such as a keyboard and mouse, and nonvolatile storage

124, such as a hard disk drive. System bus 112, I/O bus bridge 118, and I/O bus 120 thus form an interconnect coupling the attached devices, for which alternative implementations are known in the art.

Non-volatile storage 124 stores an operating system and other software controlling operation of system 100, which are loaded into system memory 114 in response to system 100 being powered on. Those skilled in the art will recognize that data processing system 100 may include many additional components not shown in FIG. 1, such as serial and parallel ports, connections to networks or attached devices, a memory controller regulating access to system memory 114, etc. Such modifications and variations are within the spirit and scope of the present invention.

Figure 2:
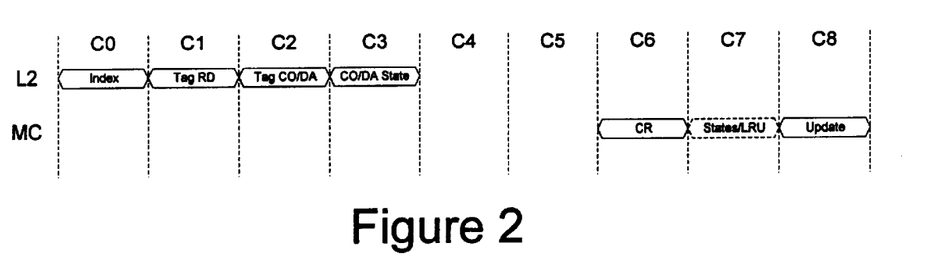
FIG. 2 is a timing diagram for a combined data access and related cast out/deallocate operation in accordance with a preferred embodiment of the present invention.

Referring to FIG. 2, a timing diagram for a combined data access and related cast out/deallocate operation in accordance with a preferred embodiment of the present invention is illustrated. In the exemplary embodiment, the combined operation is initiated on system bus 112 by an L2 cache 108a–108l in response to a cache miss for a data access operation within the L2 cache. However, the combined operation may be employed for transmission on any bus by any storage device requiring related data access and cast out/deallocate operations. Similarly, the data access operation is a READ in the exemplary embodiment, but may be any data access operation (e.g., WRITE, etc.).

When a cache miss occurs within the L2 cache for a data access operation, the cache controller for the L2 cache should be able to determine from the coherency state of the selected victim whether a cast out or deallocate operation will be required, either to preserve data within the cache location selected to be updated by the replacement policy or to update inclusivity information. Moreover, an indexed cache organization is employed for caches within the preferred embodiment. Cache lines are stored within the cache in congruence classes, sets of cache lines identified by a common index field within the system addresses for the cache lines in a congruence class.

Within an indexed cache organization, a portion of the system address for a cache line are treated as a tag, another portion of the system address is treated as the index, and the remaining bits are an intra-cache line address. The index field of the address is employed by the cache directory and the cache memory to locate congruence classes. The cache directory stores tags for cache lines contained within cache memory within the congruence class identified by the index, and compares the tag of a target address to the tags within the congruence class. If a match is identified, the corresponding cache line within cache memory is the target data.

In the prior art, the address for a data access operation and the address for a related cast out or deallocate operation are transmitted in separate system bus operations. However, within an indexed cache organization of the type described, the target data of a data access operation and the victim selected by the replacement policy are members of the same congruence class. Therefore the index field will be identical for both the data access and the cast out or deallocate operations. In the present invention, the index for the congruence class containing the target cache lines for both the data access and the cast out/deallocate ("Index") is combined with the tags for the cache line targeted by the data access ("Tag RD") and the cache line targeted by the cast out or deallocate ("Tag CO/DA").

The index and the two tags are then transmitted on the system bus in a single bus operation, which may require multiple bus cycles as shown. Fewer total bus cycles are required to transmit the combined index and tags, however, since the index need only be transmitted once. As illustrated in the example of FIG. 2, the directory state ("CO/DA State") of the cast out victim cache line—i.e., coherency state and/or LRU state—may also be appended to the address in the combined or merged bus operation. The combined response—to both the data access and the cast out operations—is driven two cycles after transmission of the cast out/deallocate victim state is complete as described in further detail below.

The combined operation of the present invention may be employed whenever the need to preserve some unique aspect of data arises, requiring a cast out operation for a related data access. Under the basic MESI coherency protocol, which includes the modified (M), exclusive (E), shared (S), and invalid (I) coherency states, a modified cache segment should be written to lower level storage when selected to be replaced. The modified state indicates that cache data has been modified with respect to corresponding data in system memory without also modifying the system memory data, such that the only valid copy of the data is within the cache entry storing the modified cache line or segment.

For exclusive, shared, or invalid cache segments, the cache segment selected for replacement need not be written to lower level storage since either (1) a valid copy already exists elsewhere in storage, or (2) the contents of the cache segment are invalid. The exclusive state indicates that the cache entry is consistent with system memory but is only found, within all caches at that level of the storage hierarchy, in the subject cache. The shared state indicates that the cache entry may be found in the subject cache as well as other caches at the same level in the storage hierarchy, with all copies of the data being consistent with the corresponding data in system memory. Finally, the invalid state indicates that a cache entry—both the data and the address tag—within a given cache entry is no longer coherent with either system memory or other caches in the storage hierarchy. However, in these instances a deallocate operation may be required as described below.

Coherency states implemented as extensions to the basic MESI protocol may also require a cast out, or elect to perform a cast out, and therefore benefit from the present invention. For example, the recent (R) state, essentially a variant of the shared state, indicates that the cache entry may be found in both the subject cache as well as other caches at the same level in the storage hierarchy, and that all copies of the data in the subject cache and other caches are consistent with the corresponding data in system memory, but also indicates that the subject cache, of all caches containing the shared data, most recently received the data in a system bus transaction such as a read from system memory. While a cast out is not necessary to preserve data integrity in such a case, a cast out operation may be useful to accurately maintain the recent state, and the combined address bus transaction of the present invention may be utilized for that purpose.

The combined operation of the present invention may also be employed whenever the need to communicate a deallocation is required; for instance, to permit a lower level, in-line and inclusive cache to update inclusivity information. Thus, when a cast out is not required for coherency when selecting a victim to make room for the target of a data access operation, a deallocate operation will frequently be required to update inclusivity information. The combined operation—with the same index and address tags but different opcodes—may be employed for both situation.

The combined operation of the present invention will save bus cycles over the dual operation scheme of the known art.

If each index or tag requires a full bus cycle to completely transmit, the combined address of the present invention may be transmitted in three bus cycles (neglecting the optional state information), rather than four bus cycles as would be required for separate data access and cast out operations. The additional bus cycle is saved because the index field need only be transmitted once for both operations.

The resulting system bus transaction condenses, within a single address, the information required for both the data access operation and the related cast out. The combined index and tags may be transmitted in any predefined order, and may be transmitted on a single bus cycle or over multiple consecutive bus cycles as shown in FIG. 2. If the combined address is transmitted over multiple bus cycles, the index should be transmitted first to allow the receiving devices to begin a directory lookup at the earliest possible time. The tags may be transmitted during subsequent cycles and still be timely for the comparators employed to compared directory tags to the target tag(s). See commonly assigned, copending United States patent application Ser. No. 09/345,302 entitled "CACHE INDEX BASED SYSTEM ADDRESS BUS," incorporated herein by reference.

Figure 3:
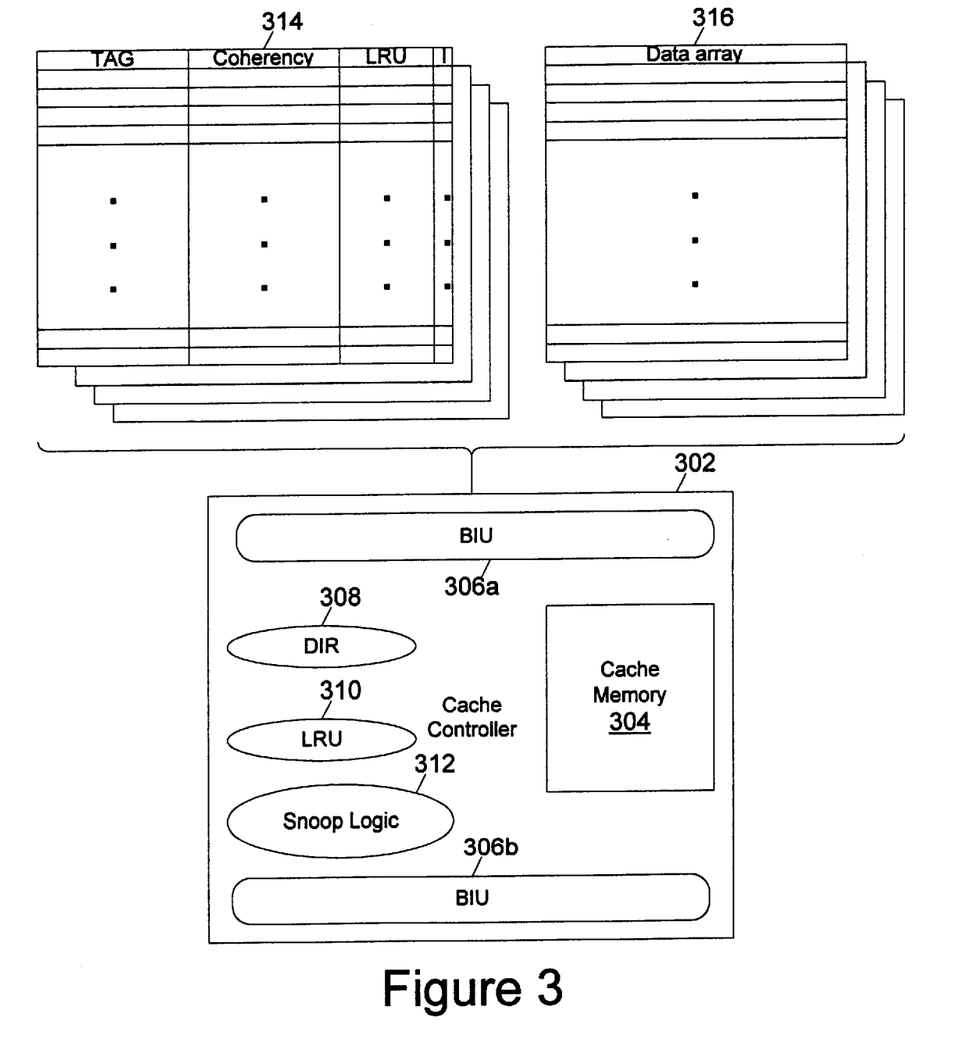
FIG. 3 depicts a diagram of a storage device which snoops and responds to the combined operation for related data access and cast out/deallocate operations in accordance with a preferred embodiment of the present invention.

With reference now to FIG. 3, a diagram of a storage device which snoops and responds to the combined operation for related data access and cast out/deallocate operations in accordance with a preferred embodiment of the present invention is depicted. The elements depicted are employed in L2 caches 108a–108l and in L3 caches 110a–110l. A cache controller 302 receives and transmits operations relating to data within cache memory 304 from upstream and downstream buses through bus interface units ("BIU") 306a and 306b. A directory lookup 308 is employed to locate cache lines within cache memory 304 and an LRU unit 310 implements the replacement policy for updating cache lines within cache memory 304. Snoop logic 312 detects operations initiated by a horizontal storage device (i.e., another L2 cache for L2 caches 108a–108l, and another L3 cache for L3 caches 110a–110l). Snoop logic 312 also controls the snoop response driven by the respective L2 cache in response to snooped operations.

The logical organization of data within the cache is in tables containing cache directory entries 314 and a corresponding data array 316. The cache directory entries 314 contain the address tag for the corresponding cache lines within data array 316, as well as the coherency state, the LRU status, and an inclusivity ("I") state for the respective cache line. The coherency state indicates the cache line consistency with other copies of the cache line in other storage devices within the system. The LRU status indicates the LRU position for the cache line within a congruence class. The inclusivity state indicates whether the cache line is stored within a logically in-line, higher level cache.

When a data access operation is received from a processor or higher level storage device, cache controller 302 may trigger the LRU 310 to select a victim, then look up the selected victim to determine if a cast out would be required to update the corresponding cache line and, if so, retrieve the tag for the current contents of the potential victim. This may be performed concurrently with the directory lookup and tag comparison employed to determine whether the received data access operation generates a cache hit or miss.

On the system bus side of the respective cache, when a combined operation for related data access and cast out/deallocate operations is detected by cache controller 302 on a lower level bus coupling the cache and horizontal caches to lower levels of the storage hierarchy, snoop logic 312 may access cache directory entries 314 for both the data access target and the cast out/deallocate victim to determine whether the target or victim are contained within data array 316 and, if so, to ascertain the coherency state and LRU position for the target and victim within the respective cache. Snoop logic 312 then drives a snoop response for the data access and cast out or deallocate operations to the combined response logic.

Figure 4A:
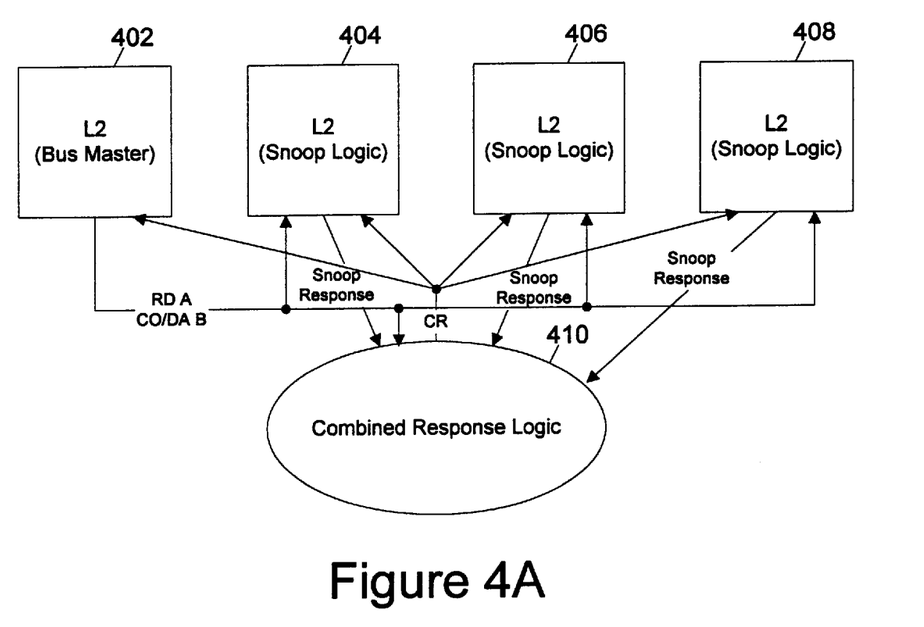
FIGS. 4A–4B are diagrams of a mechanism for altering a coherency state and/or LRU position as a result of a combined data access and cast out/deallocate operation in accordance with a preferred embodiment of the present invention.
Figure 4B:
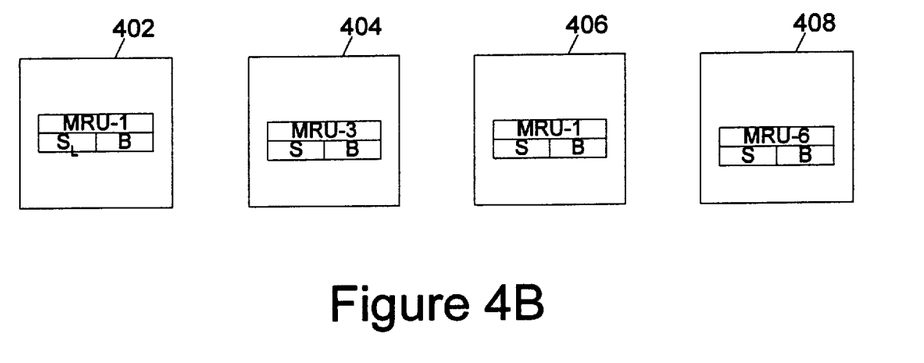

Referring to FIGS. 4A through 4B, diagrams of a mechanism for altering a coherency state and/or LRU position as a result of a combined data access and cast out/deallocate operation in accordance with a preferred embodiment of the present invention is illustrated. The example selected for the purposes of describing the invention relates to L2 caches 108a–108l and system bus 112 depicted in FIG. 1.

In the exemplary embodiment shown for the present invention, an L2 cache receives a data access operation from an in-line processor which misses. A cast out or deallocate is required within L2 cache for replacement of an existing cache segment by the data access target. The bus interface logic 402 of the L2 cache therefore initiates (acting as a "bus master" after requesting and being granted the system bus) a combined data access and cast out/deallocate operation described above on the system bus. The combined data access operation requests a read of the cache line with the address A ("RD A") and a cast out or deallocate of the cache line with the address B ("CO/DA B").

The combined operation is detected by snoop logic 404, 406 and 408 within the remaining L2 caches coupled to the system bus, and is also received by combined response logic 410 (typically a part of the bus controller or the memory controller). Snoop logic 404, 406 and 408 checks the state of both the data access target and the cast out/deallocate victim within the respective L2 cache. For both the data access target and the cast out/deallocate victim, snoop logic 404, 406 and 408 determines whether the subject cache line is contained within the respective L2 cache and, if so, what coherency state and LRU position are associated with the subject cache line in the respective L2 cache. Of particular interest, as will be shown below, are the coherency state and LRU position of the cast out/deallocate victim. Snoop logic 404, 406 and 408 may also determine whether the respective L2 cache contains an invalid entry in the congruence class for the data access target and the cast out/deallocate victim.

Based on the presence or absence of the subject cache line within a corresponding storage device and the coherency state of the subject cache line, snoop logic 404, 406 and 408 selects appropriate responses to the data access and cast out/deallocate operations. The responses selected may include a null response to either the data access or the cast out/deallocate, a retry for the data access or the cast out/deallocate, or an intervention for the data access.

The selected responses are "merged" by snoop logic 404, 406 and 408 by selecting a single response code representing both selected responses to the data access and cast out/deallocate operations. Snoop logic 404, 406 and 408 also appends the cache state for the cast out/deallocate victim—i.e., the coherency state, the LRU position, or both—to the merged response. It should be noted that the "merged response" is the joint response of a single storage device to two related (and, within the prior art, formerly discrete) data access and cast out/deallocate operations, and differs from the "combined response" of all storage devices coupled to a bus on which the operations are initiated. Snoop logic 404, 406 and 408 then drives merged response with any appended information to the combined response logic 410.

Combine d response logic 410 receives the merged responses of snoop logic 404, 406 and 408 and generates a combined response to be driven on system bus 112. Combined response logic 410 may append the coherency state and LRU position of the victim within each snooper coupled to the system bus (i.e., the L2 caches corresponding to snoop logic 404, 406 and 408) to the combined response. The combined response is received by the bus master 402 and snoop logic 404l 406 and 408. Snoop logic 404, 406 and 408, upon detecting the combined response and the appended coherency state and LRU position information, may determine whether to alter the coherency state and/or LRU position within the corresponding L2 cache.

In some cases, however, it may be necessary or preferable for combined response logic 410 to identify and direct exploitation of opportunities to update the coherency state or LRU position. For example, the L2 caches corresponding to snoop logic 404, 406, and 408 may each have an apparently equal opportunity to upgrade the coherency state of the victim, and no apparent preference may exist for updating the LRU position of the victim within one snooper rather than in another. Additionally, combined response logic 410 may have additional information not available to snoop logic 404, 406, and 408 (e.g., from inline L3 caches). Alternatively, it may just be simpler for combined response logic 410 to append a coherency state and LRU position update command to the combined response than to append the coherency state and LRU position information for each snooper responding to the combined operation.

FIG. 4B illustrates a circumstance in which the combined response may direct an update of the coherency state and/or LRU position of a cache line corresponding to the victim within a particular L2 cache. Bus master 402 drives a combined operation including a cast out or deallocate of victim B, which is in the "$S_L$" coherency state, a variant of the shared coherency state indicating that the corresponding L2 cache is responsible for shared intervention in a data access by another L2 cache within a defined group. The remaining L2 caches (corresponding to snoop logic 404, 406 and 408), which make up the defined group in this example, also contain the victim B, but in an ordinary shared coherency state. However, the LRU position differs in each L2: victim B is MRU–3 ("most recently used minus three") for the L2 cache corresponding to snoop logic 404; victim B is MRU–1 for the L2 cache corresponding to snoop logic 406; and victim B is MRU–6 for the L2 cache corresponding to snoop logic 408.

Each L2 cache snooping the combined operation appends the LRU position to the snoop response, which is accumulated by the combined response logic and may or may not appended to the combined response. Since the $S_L$ copy of the victim cache line is being deallocated, a new $S_L$ must be selected to bear shared intervention responsibility for the defined group of L2 caches. The combined response logic 410 may randomly select a snooper to update the coherency state of a cache line corresponding to victim B to the $S_L$ coherency state, and may optionally direct that snooper to update the LRU position of victim B within local storage to the highest LRU position in order to keep that copy of the cache line within that level of the storage hierarchy longer. The coherency state and/or LRU position update command is appended to the combined response transmitted by the combined response logic 410.

Alternatively, combined response logic 410 may examine the LRU positions appended to the snoop responses of snoop 10 logic 404, 406 and 408, and select the L2 cache with the lowest LRU position for the cast out/deallocate victim B (MRU–1, within the L2 cache corresponding to snoop logic 406) to have the coherency state for the victim B within its own storage updates to $S_L$, and optionally to have the associated LRU position of that cache line updated to the highest LRU position.

The use of LRU position to select a new $S_L$ is an optimization, and the LRU position of the new $S_L$ may also be altered to the highest LRU position (e.g., MRU–0), to keep the new $S_L$ within the cache as long as possible. Further-more, the coherency state need not be altered as in the example shown, with the LRU position alone within a selected snooper being updated as a result of a update command appended to the combined response to improve data management by prolonging the tenure of the victim B within some storage device at the L2 cache level. The use of combined response logic 410 to select a coherency state and/or LRU position update, appending the update command to the combined response, simplifies the logic required for each snooper, centralizes the upgrade selection decision, and may reduce bus traffic by eliminating the need to append the coherency state and LRU position for each snooper to the combined response.

Figure 5A:
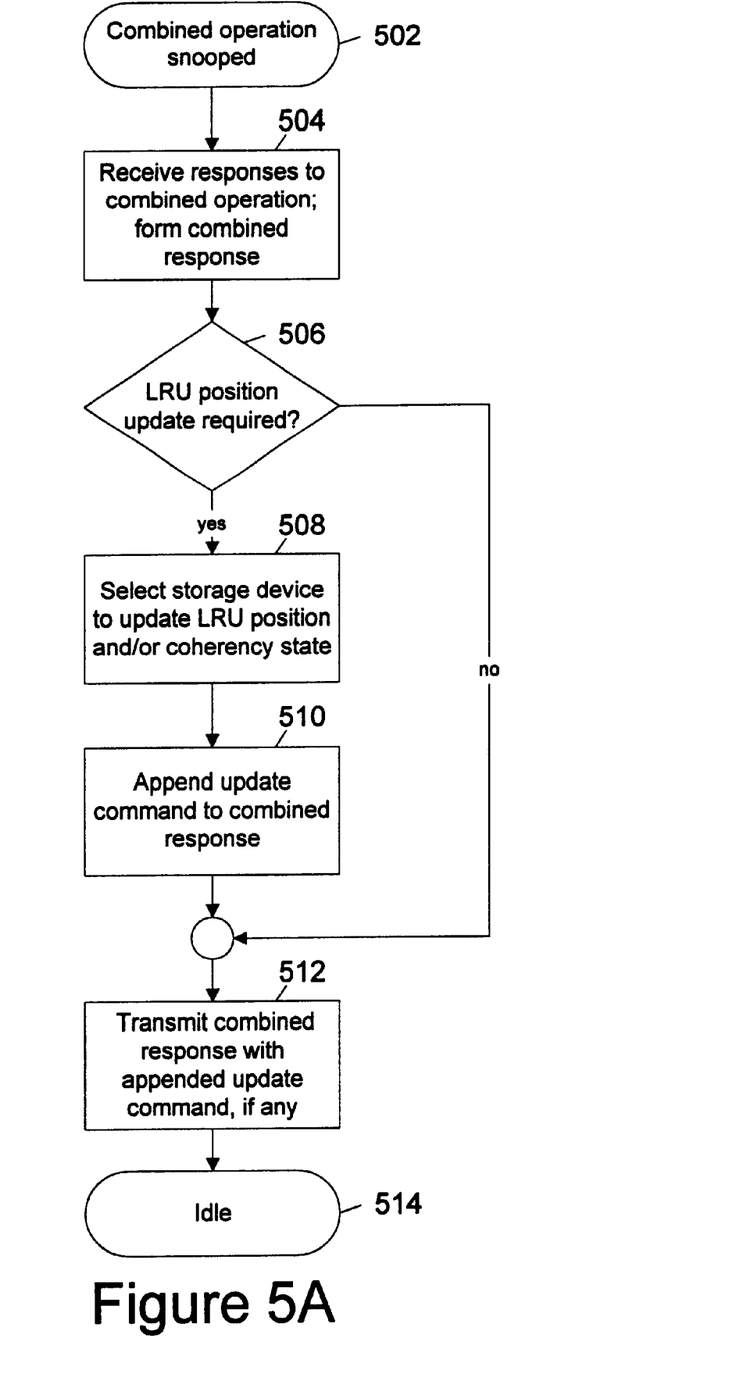
FIGS. 5A–5B are high level flow charts for a process of updating an LRU position and/or a coherency state utilizing a combined response to a combined data access and cast out/deallocate operation in accordance with a preferred embodiment of the present invention.
Figure 5B:
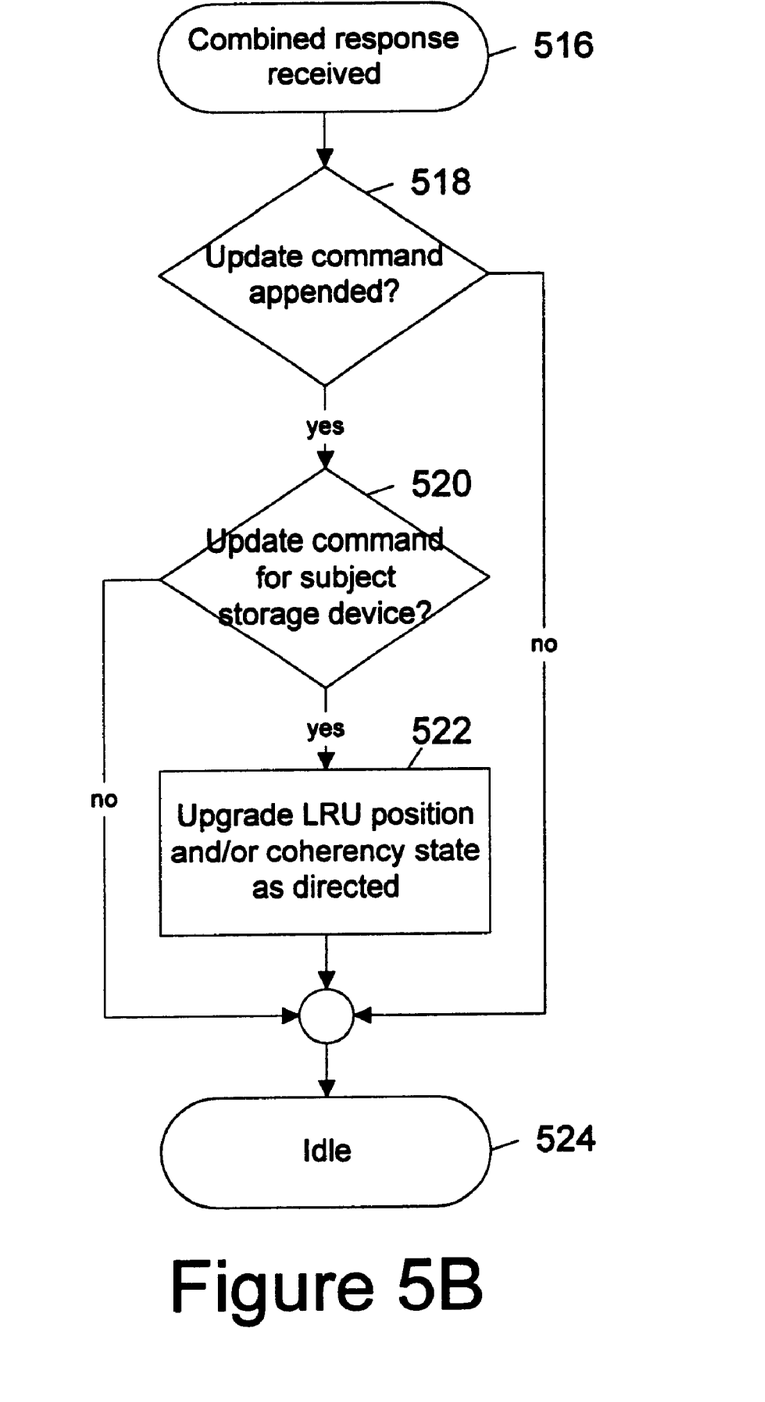

With reference now to FIGS. 5A and 5B, high level flow charts for a process of updating an LRU position and/or a coherency state utilizing a combined response to a combined data access and cast out/deallocate operation in accordance with a preferred embodiment of the present invention are depicted. FIG. 5A depicts the process of selecting a snooper for updating and transmitting the update command, which is executed within combined response logic for storage devices snooping the combined data access and cast out/deallocate operation.

The process begins at step 502, which depicts detection by snoop logic of the combined operation, with appended coherency state information, on a bus coupling the storage device initiating the operation to horizontal storage devices (storage at the same level in the storage hierarchy) and the combined response logic. The process next passes to step 504, which illustrates receiving the responses from snoopers and lower level storage devices to the combined operation and formulating the combined response. The process then passes to step 506, which depicts a determination of whether an LRU position and/or coherency state update for a snooper is required by the cast out/deallocate portion of the combined operation.

If an LRU position and/or coherency state update is required, the process then passes to step 508, which illustrates selecting a snooper storage device to have the LRU position and/or coherency state of a cache line corresponding to the victim updated. The selection of the snooper to be updated may be made randomly, based on LRU position, or based on other criteria. The process passes next to step 510, which depicts appending the update command, identifying the selected snooper to be updated, to the combined response.

The process then passes to step 512, which illustrates transmitting the combined response with the appended update command, if any, on the bus coupling the combined response logic to the storage device initiating the combined operation. The process passes next to step 514, which depicts the process becoming idle until another combined operation is received.

FIG. 5B depicts the process of handling an update command, which is executed within each storage device snooping a combined data access and cast out/deallocate operation from a horizontal storage device. The process begins at step 516, which illustrates receiving the combined response on the bus coupling the snoopers to the combined response logic. The process next passes to step 518, which depicts a determination of whether an update command is appended to the combined response. If so, the process proceeds to step 520, which depicts a determination of whether the appended update command is directed to the subject storage device—that is, whether the update command identifies the storage device receiving and processing the combined response.

If the subject storage device is identified within the update command, the process passes to step 522, which illustrates updating the LRU position and/or the coherency state of the cache line corresponding to the victim as directed. The process then passes to step 524, which depicts the process becoming idle until another combined response is received.

While the invention has been particularly shown and described with reference to a preferred embodiment, it will be understood by those skilled in the art that various changes in form and detail may be made therein without departing from the spirit and scope of the invention.

What is claimed is:

1. A method of data storage management, comprising:
   receiving an operation involving replacement of a victim within a storage device, wherein the operation includes a coherency state or an LRU position of the victim;
   receiving snoop responses from snoopers of the operation containing data elements corresponding to the victim, wherein each snoop response includes an LRU position within a respective snooper of a data element corresponding to the victim;
   determining whether the LRU position of a data element corresponding to the victim within a snooper should be upgraded; and
   transmitting a response to the operation including a command to update the LRU position of a data element corresponding to the victim within a snooper.

2. The method of claim 1, wherein the step of receiving an operation involving replacement of a victim within a storage device further comprises:
   receiving a combined data access and related cast out or deallocate operation.

3. The method of claim 1, wherein the step of receiving snoop responses from snoopers containing data elements corresponding to the victim further comprises:
   receiving the snoop responses, wherein each snoop response includes a coherency state of the data element corresponding to the victim within a respective snooper.

4. The method of claim 1, wherein the step of determining whether the LRU position of a data element corresponding to the victim within a snooper should be upgraded further comprises:
   determining whether the coherency state of the victim is higher than the coherency state of any data element corresponding to the victim within a snooper.

5. The method of claim 1, further comprising:
   selecting a snooper containing a data element corresponding to the victim in which to update the LRU position of a data element corresponding to the victim.

6. The method of claim 5, wherein the step of selecting a snooper containing a data element corresponding to the victim in which to upgrade the LRU position of a data element corresponding to the victim further comprises:
   randomly selecting a snooper from among snoopers having a data element corresponding to the victim.

7. The method of claim 5, wherein the step of selecting a snooper containing a data element corresponding to the victim in which to upgrade the LRU position of a data element corresponding to the victim further comprises:
   selecting a snooper having a highest LRU position for the data element corresponding to the victim among snoopers having a data element corresponding to the victim.

8. The method of claim 5, wherein the step of transmitting a response to the operation including a directive to update the LRU position of a data element corresponding to the victim within a snooper further comprises:
   transmitting the response with a command appended identifying the selected snooper which is to update the LRU position.

9. A system for data storage management, comprising:
   a storage device coupled to a bus and, acting as a bus master of the bus, initiating an operation on the bus involving replacement of a victim within the storage device, wherein the operation includes a coherency state or an LRU position of the victim;
   at least one other storage device coupled to the bus and containing a data element corresponding to the victim, the at least one other storage device snooping the operation and driving a snoop response to the operation on the bus, wherein each snoop response includes an LRU position within a respective snooper of a data element corresponding to the victim; and
   combined response logic coupled to the bus, detecting the operation, receiving the snoop responses from snoopers of the operation, and determining whether the LRU position of a data element corresponding to the victim within a snooper should be upgraded,
   wherein the combined response logic, responsive to determining that the LRU position of a data element corresponding to the victim within a snooper should be upgraded, transmits a response to the operation on the bus including a command to update the LRU position of a data element corresponding to the victim within a snooper.

10. The system of claim 9, wherein the bus master storage device initiates a combined data access and related cast out or deallocate operation.

11. The system of claim 9, wherein the at least one other storage device drives a snoop response including a coherency state of the data element corresponding to the victim within a respective snooper.

12. The system of claim 9, wherein the combined response logic determines whether the LRU position of a data element corresponding to the victim within a snooper should be updated by determining whether the coherency state of the victim is higher than the coherency state of any data element corresponding to the victim within a snooper.

13. The system of claim 9, wherein the combined response logic selects a snooper containing a data element corresponding to the victim in which to update the LRU position of a data element corresponding to the victim.

14. The system of claim 13, wherein the combined response logic randomly selects a snooper from among snoopers having a data element corresponding to the victim.

15. The system of claim 13, wherein the combined response logic selects a snooper having a highest LRU position for the data element corresponding to the victim among snoopers having a data element corresponding to the victim.

16. The system of claim 13, wherein the combined response logic transmits the response to the operation with a command appended identifying the selected snooper which is to update the LRU position of a data element corresponding to the victim.

17. A method of upgrading a coherency state, comprising:

determining, from a coherency state of a cast out or deallocate victim and a coherency state for each data element corresponding to the victim, whether an LRU position for a data element corresponding to the victim should be updated; and responsive to determining that an LRU position for a data element corresponding to the victim should be updated, transmitting an update command with a response to an operation involving a cast out or deallocate of the victim.

18. The method of claim 17, further comprising:

selecting a storage device in which to update an LRU position of a data element corresponding to the victim;

identifying the selected storage device within the update command.

19. The method of claim 18, further comprising:

receiving the response with the update command at a storage device containing a data element corresponding to the victim;

determining whether the receiving storage device is the selected storage device; and responsive to determining that the receiving storage device is the selected storage device, updating the LRU position of the data element corresponding to the victim.

20. The method of claim 19, wherein the step of updating the LRU position of the data element corresponding to the victim further comprises:

upgrading the LRU position in accordance with the update command.

* * * * *